J. C. BARBER.
DRAW BAR BUFFER.
APPLICATION FILED MAY 7, 1919.
1,341,455.
Patented May 25, 1920.
2 SHEETS—SHEET 1.
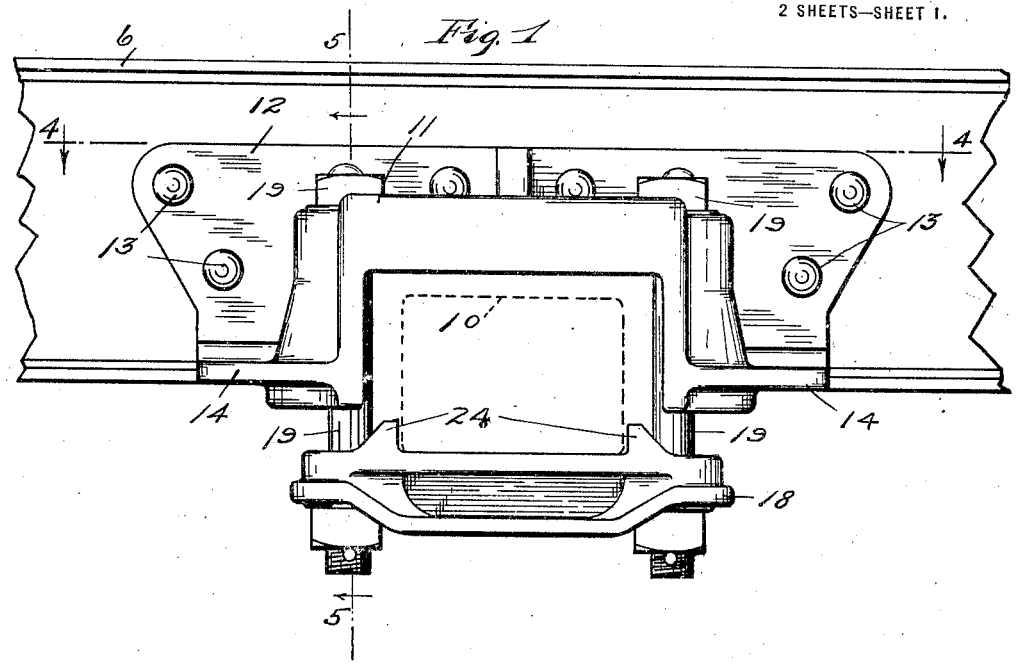
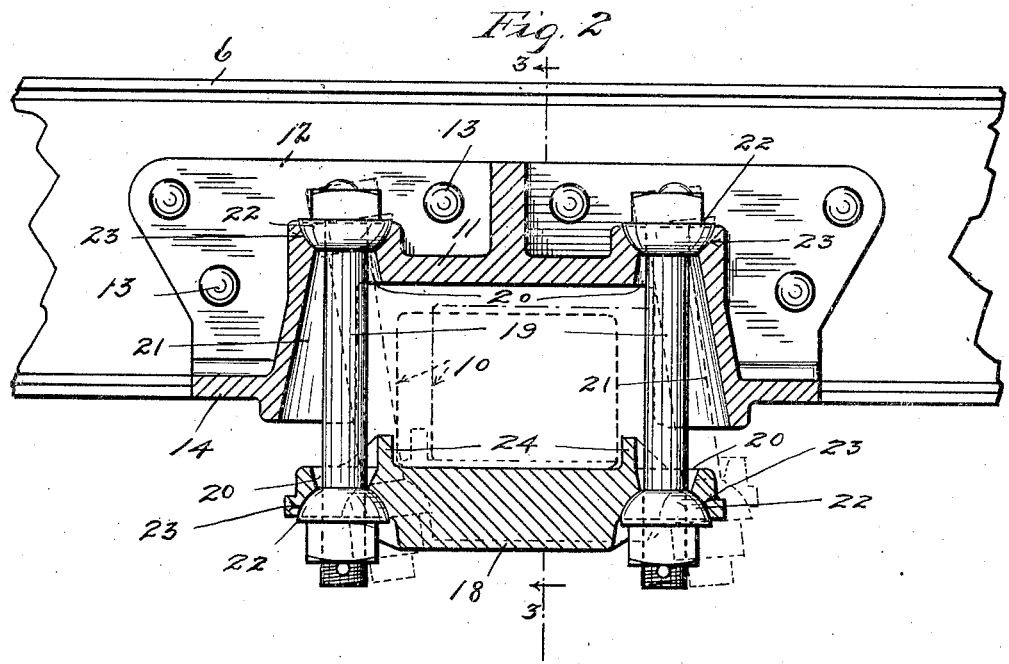
Inventor
John C. Barber
By his Attorneys J. C. BARBER.
DRAW BAR BUFFER.
APPLICATION FILED MAY 7, 1919.
1,341,455.
Patented May 25, 1920.
2 SHEETS—SHEET 2.
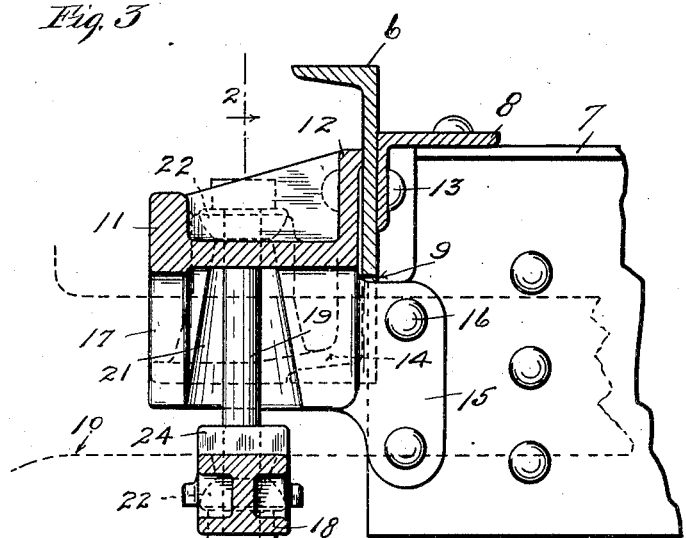
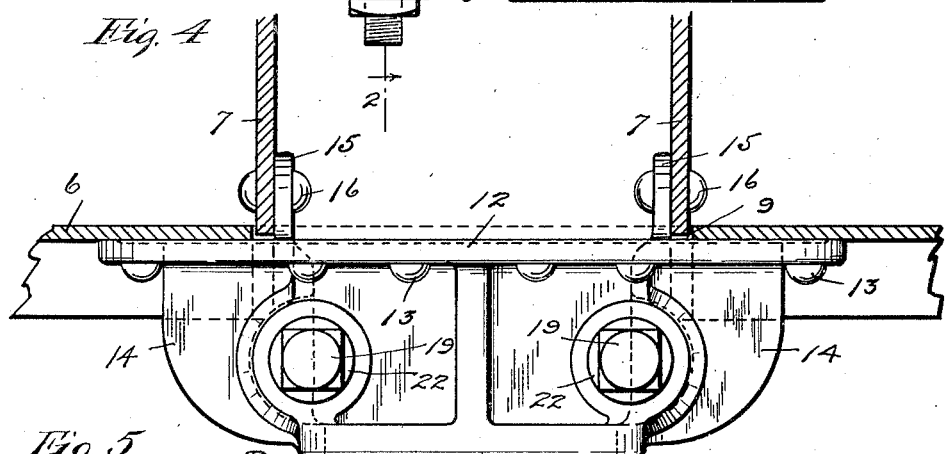
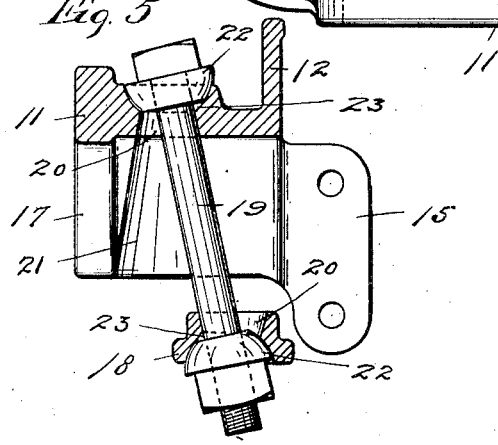
Inventor
John C. Barber
By his Attorneys

UNITED STATES PATENT OFFICE.

JOHN C. BARBER, OF CHICAGO, ILLINOIS, ASSIGNOR TO STANDARD CAR TRUCK COMPANY, OF CHICAGO, ILLINOIS, A CORPORATION OF NEW JERSEY.

DRAW-BAR BUFFER.

1,341,455.   Specification of Letters Patent.   Patented May 25, 1920.

Application filed May 7, 1919. Serial No. 295,392.

*To all whom it may concern:*

Be it known that I, JOHN C. BARBER, a citizen of the United States, residing at Chicago, in the county of Cook and State of Illinois, have invented certain new and useful Improvements in Draw-Bar Buffers; and I do hereby declare the following to be a full, clear, and exact description of the invention, such as will enable others skilled in the art to which it appertains to make and use the same.

My invention relates to improvements in draw-bar buffers and has for its primary object to provide such buffers with swinging brackets, for supporting coupler shanks, which eliminate wear between the shanks and their supports and lessen the wear on the coupler knuckles and also center the draw-bars.

To the above end the invention consists of the novel devices and combinations of devices hereinafter described and defined in the claim.

In the accompanying drawings, which illustrate the inventions, like characters indicate like parts throughout the several views.

Referring to the drawings:—

Figure 1 is an end elevation showing the invention applied to a car, also diagrammatically showing the coupled shank by means of broken lines;

Fig. 2 is a view principally in transverse section taken on the line 2—2 of Fig. 3, with some parts shown in different positions by means of broken lines; and Fig. 3 is a longitudinal vertical section taken on the line 3—3 of Fig. 2;

Fig. 4 is a view principally in plan with some parts sectioned on the line 4—4 of Fig. 1; and Fig. 5 is a view partly in elevation and partly in longitudinal vertical section taken on the line 5—5 of Fig. 1, with the supporting bracket in its rearmost position.

The numeral 6 indicates the channel end sill of a car and the numeral 7 indicates the channel draft sills thereof, which as shown are rigidly connected by an angle bar 8 to said end sill. The lower portion of the end sill 6, between the draft sill 7, is notched or cut away at 9 to afford clearance for a coupler shank 10 diagrammatically illustrated by means of broken lines.

The buffer, as shown, is a cast structure which projects outward from the end sill 6 and its body, in cross section, is in the form of a yoke that embraces the coupler shank 10 with sufficient clearance to permit the required lateral and lifting movements of said shank. On the inner end of the buffer body 11 is a vertical flange 12 which extends above and laterally from said body, bears against the outer face of the end sill 6 and is rigidly secured thereto by rivets 13. The lower edge portion of the flange 12 is extended outward at 14 and given a contour which fits over the lower flange of the end sill 6 and supports the buffer therefrom.

To further rigidly secure the buffer to the car the sides of its body are extended inward through the opening 9 to afford a pair of flat lugs 15 which bear against the inner faces of the draft sills 7 and are rigidly secured thereto by rivets 16. The buffer body 11 and its flange 12 are suitably reinforced by ribs and on the inner face of said body, at the outer end thereof, is a shallow wearing surface 17 for the coupler shank 10.

The coupler shank 10 is supported within the buffer body 11, on a bracket 18, preferably of cast steel, which extends transversely under said shank and is suspended at its ends below and from said body by a pair of nut equipped bolts 19. These bolts 19 extend through tapered holes 20 in the top of the buffer body 11 and in the ends of the supporting bracket 18, and which holes flare toward each other to permit the required swinging movement of said bolts.

The tapered holes 20 in the buffer body 11 also extend into the inner faces of the sides of said body to afford open recesses 21 for the bolts 19. Washers 22 on the bolts 19 are interposed between the heads of the bolts, and the top of the buffer body 11, and between the nuts on said bolts, and the bracket 18. These washers 22 have spherical surfaces, which fit correspondingly formed cup or socket-like seats 23, in the buffer body 11 and bracket 18. Obviously, these washers 22 and seats 23 afford ball and socket-like connections for the bolts 19 to permit the required universal swinging movement of the brackets 18 in a horizontal plane.

On the top of the supporting bracket 18 are two integrally formed lugs 24 arranged to be engaged by the sides of the coupler shank 10, and thereby keep said bracket properly positioned under the coupler shank 10. By supporting the coupler shank 10 on a bracket held for common universal swinging movement therewith, in place of supporting said shank on a fixed bearing as is now the common practice, as previously stated, all wear between the coupler shank and its support is eliminated and all wear on the coupler knuckles is lessened and the draw bar is centered or returned to its normal position. Normally, the inner faces of the bolts 19 project slightly outward of the recesses 20, but under lateral movements of the coupler shank move entirely within said recesses and do not interfere with the full lateral movement of the coupler shank between its wearing surfaces 17 and the buffer.

What I claim is:—

A draw-bar buffer having a body that is yoke-like in cross section and embraces a coupler shank, a bracket underlying said body and supporting the coupler shank, and a pair of rods having spherical ends seated in correspondingly formed seats in the buffer and bracket and supporting said bracket from the buffer for universal swinging movement, said body being provided with recesses into which the rods may alternately move under extreme lateral movement of the coupler shank to expose said body to the coupler shank as a stop.

In testimony whereof I affix my signature in presence of two witnesses.

JOHN C. BARBER.

Witnesses:
  ORPHEUS N. PARMELEE,
  F. L. BARBER.